(12) United States Patent
Connell, II et al.

(10) Patent No.: US 11,361,636 B2
(45) Date of Patent: Jun. 14, 2022

(54) GUNSHOT DETECTION SYSTEM ANTI-TAMPERING PROTECTION

(71) Applicant: Johnson Controls Fire Protection LP, Boca Raton, FL (US)

(72) Inventors: Thomas Wysong Connell, II, Westminster, MA (US); Alan Levin, III, Bolton, MA (US); Timothy L. Ficarra, Billerica, MA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/968,936

(22) PCT Filed: Feb. 14, 2019

(86) PCT No.: PCT/IB2019/051206
§ 371 (c)(1),
(2) Date: Aug. 11, 2020

(87) PCT Pub. No.: WO2019/159102
PCT Pub. Date: Aug. 22, 2019

(65) Prior Publication Data
US 2021/0051055 A1 Feb. 18, 2021

Related U.S. Application Data

(60) Provisional application No. 62/637,161, filed on Mar. 1, 2018, provisional application No. 62/631,296, filed on Feb. 15, 2018.

(51) Int. Cl.
*G08B 13/16* (2006.01)
*G08B 25/14* (2006.01)
(Continued)

(52) U.S. Cl.
CPC ......... *G08B 13/1672* (2013.01); *G06F 16/61* (2019.01); *G06F 21/602* (2013.01);
(Continued)

(58) Field of Classification Search
CPC .... G08B 13/1672; G08B 25/14; G08B 17/00; G06F 21/602; H04L 41/06; G06Q 50/265
(Continued)

(56) References Cited

U.S. PATENT DOCUMENTS 4,709,330 A 11/1987 Yokoi et al.
5,504,717 A 4/1996 Sharkey et al.
(Continued)

FOREIGN PATENT DOCUMENTS

CN 102 843 205 B 12/2012
EP 1 806 952 A2 7/2007
(Continued)

OTHER PUBLICATIONS

International Search Report and Written Opinion of the International Searching Authority, dated Jun. 18, 2019, from International Application No. PCT/IB2019/051202, filed on Feb. 14, 2019. 24 pages. (WO1).
(Continued)

*Primary Examiner* — John A Tweel, Jr.
(74) *Attorney, Agent, or Firm* — HoustonHogle LLP (57) ABSTRACT

A gunshot detection system provides anti-tampering protection for gunshot sensor units and a control panel. The control panel monitors for tampering events, including monitoring for changes to configuration settings. When the settings are changed, even by an authorized user, the control panel generates a tampering alert and sends the alert to an operator of the control panel and/or administrators for the gunshot detection system. A similar notification might also occur when a sensor is taken offline or when an anti-tamper sensor
(Continued)

on a housing of the gunshot sensor unit detects manipulation or opening of the housing. The control panel also monitors for tampering using machine certificates associated with the gunshot sensor units. In one example, the gunshot sensor units sign event data using the machine certificates and an arbitrary reference number known to the control panel. The control panel then verifies the signed event data to detect tampering events.

20 Claims, 6 Drawing Sheets

(51) Int. Cl.

| | | |
|---|---|---|
| G06F 21/60 | (2013.01) | |
| G08B 17/06 | (2006.01) | |
| G08B 25/10 | (2006.01) | |
| H04L 41/06 | (2022.01) | |
| G08B 17/00 | (2006.01) | |
| G08B 29/18 | (2006.01) | |
| G08B 29/24 | (2006.01) | |
| G06F 16/61 | (2019.01) | |
| H04W 12/037 | (2021.01) | |
| G06Q 50/26 | (2012.01) | |
| H04L 9/08 | (2006.01) | |
| H04L 9/14 | (2006.01) | |
| H04W 56/00 | (2009.01) | |
| G08B 19/00 | (2006.01) | |
| G08B 25/04 | (2006.01) | |
| G07C 9/00 | (2020.01) | |
| G08B 7/06 | (2006.01) | |
| G08B 25/01 | (2006.01) | |
| H04W 84/18 | (2009.01) | |
| H04W 84/20 | (2009.01) | |

(52) U.S. Cl.
CPC ....... *G06Q 50/265* (2013.01); *G07C 9/00182* (2013.01); *G08B 7/066* (2013.01); *G08B 17/00* (2013.01); *G08B 17/06* (2013.01); *G08B 19/00* (2013.01); *G08B 25/014* (2013.01); *G08B 25/04* (2013.01); *G08B 25/10* (2013.01); *G08B 25/14* (2013.01); *G08B 29/188* (2013.01); *G08B 29/24* (2013.01); *H04L 9/0894* (2013.01); *H04L 9/14* (2013.01); *H04L 41/06* (2013.01); *H04W 12/037* (2021.01); *H04W 56/0015* (2013.01); *H04W 84/18* (2013.01); *H04W 84/20* (2013.01)

(58) Field of Classification Search
USPC ....................................................... 709/224
See application file for complete search history.

(56) References Cited

U.S. PATENT DOCUMENTS

| | | | |
|---|---|---|---|
| 5,973,998 | A | 10/1999 | Showen et al. |
| 6,552,963 | B2 | 4/2003 | Baranek et al. |
| 6,970,183 | B1 | 11/2005 | Monroe |
| 7,228,429 | B2 | 6/2007 | Monroe |
| 7,411,865 | B2 | 8/2008 | Calhoun |
| 7,460,006 | B2 | 12/2008 | Kates |
| 7,676,194 | B2 | 3/2010 | Rappaport |
| 7,843,356 | B2* | 11/2010 | Webb .............. G08B 27/00 340/632 |
| 7,986,231 | B1 | 7/2011 | Bentley et al. |
| 8,149,649 | B1 | 4/2012 | Brinn et al. |
| 8,806,632 | B2* | 8/2014 | Stefanidakis ....... H04L 63/1458 726/23 |
| 9,432,720 | B2 | 8/2016 | Kruglick |
| 9,642,131 | B2 | 5/2017 | Bohlander et al. |
| 9,672,700 | B2 | 6/2017 | Lax |
| 9,672,727 | B1 | 6/2017 | Alexander et al. |
| 9,679,459 | B2 | 6/2017 | Crowe |
| 9,830,932 | B1 | 11/2017 | Gunderson et al. |
| 9,888,371 | B1 | 2/2018 | Jacob |
| 10,089,845 | B2 | 10/2018 | Skorpik et al. |
| 10,102,732 | B2 | 10/2018 | Gersten |
| 10,586,109 | B1 | 3/2020 | Fowler et al. |
| 10,657,800 | B1 | 5/2020 | Fowler et al. |
| 10,741,058 | B1 | 8/2020 | Miller |
| 10,928,244 | B2 | 2/2021 | Warren et al. |
| 11,170,619 | B2 | 11/2021 | Connell, II et al. |
| 11,282,536 | B2 | 3/2022 | Davis et al. |
| 2006/0109113 | A1 | 5/2006 | Reyes et al. |
| 2008/0165621 | A1 | 7/2008 | Fisher et al. |
| 2009/0222241 | A1 | 9/2009 | Dorogi et al. |
| 2010/0271905 | A1 | 10/2010 | Khan et al. |
| 2010/0305778 | A1 | 12/2010 | Dorneich et al. |
| 2011/0169633 | A1 | 7/2011 | Lauder et al. |
| 2014/0218518 | A1 | 8/2014 | Oliver |
| 2014/0222943 | A1 | 8/2014 | Oleson et al. |
| 2014/0269199 | A1 | 9/2014 | Weldon et al. |
| 2014/0277609 | A1 | 9/2014 | Nye et al. |
| 2014/0327543 | A1 | 11/2014 | Showen et al. |
| 2014/0340222 | A1 | 11/2014 | Thornton et al. |
| 2015/0061869 | A1 | 3/2015 | Crowe et al. |
| 2015/0070166 | A1 | 3/2015 | Boyden et al. |
| 2015/0077550 | A1 | 3/2015 | Apelbaum et al. |
| 2015/0339913 | A1 | 11/2015 | Lyman et al. |
| 2015/0347079 | A1 | 12/2015 | Price et al. |
| 2016/0232774 | A1 | 8/2016 | Noland et al. |
| 2016/0260307 | A1 | 9/2016 | Skorpik et al. |
| 2016/0269397 | A1 | 9/2016 | Camenisch et al. |
| 2016/0379456 | A1 | 12/2016 | Nongpiur et al. |
| 2017/0045336 | A1 | 2/2017 | Crowe et al. |
| 2017/0069190 | A1 | 3/2017 | Hansen et al. |
| 2017/0103643 | A1 | 4/2017 | Powers, III et al. |
| 2017/0169686 | A1 | 6/2017 | Skorpik et al. |
| 2017/0289650 | A1 | 10/2017 | Schattmaier et al. |
| 2017/0301220 | A1 | 10/2017 | Jarrell et al. |
| 2018/0053394 | A1 | 2/2018 | Gersten |
| 2018/0122030 | A1 | 5/2018 | Raz et al. |
| 2018/0160278 | A1 | 6/2018 | Patel et al. |
| 2018/0199179 | A1 | 7/2018 | Rauner |
| 2019/0130723 | A1 | 5/2019 | Thiel et al. |
| 2019/0213901 | A1 | 7/2019 | Kur et al. |
| 2019/0347920 | A1 | 11/2019 | Anderson et al. |
| 2021/0158837 | A1 | 5/2021 | Saki et al. |
| 2021/0202067 | A1 | 7/2021 | Williams et al. |

FOREIGN PATENT DOCUMENTS

| | | |
|---|---|---|
| EP | 3032508 A1 | 6/2016 |
| JP | 2001236822 A | 8/2001 |
| JP | 4973380 B2 | 7/2012 |
| JP | 2017520831 | 7/2017 |
| WO | WO 9110980 | 7/1991 |
| WO | WO 2010039130 | 4/2010 |
| WO | WO 2010111556 | 9/2010 |
| WO | WO 2011134371 | 11/2011 |
| WO | WO 2012092562 | 7/2012 |
| WO | WO 2018044553 | 3/2018 |
| WO | WO 2018044556 | 3/2018 |
| WO | WO 2018185723 | 10/2018 |
| WO | WO 2019159098 | 8/2019 |
| WO | WO 2019159099 | 8/2019 |
| WO | WO 2019159100 | 8/2019 |
| WO | WO 2019159101 | 8/2019 |
| WO | WO 2019159103 | 8/2019 |
| WO | WO 2019159104 | 8/2019 |

(56) References Cited

FOREIGN PATENT DOCUMENTS

| WO | WO 2019159105 | 8/2019 |
|----|---------------|--------|
| WO | WO 2019159106 | 8/2019 |

OTHER PUBLICATIONS

International Search Report and Written Opinion of the International Searching Authority, dated May 21, 2019, from International Application No. PCT/IB2019/051203, filed on Feb. 14, 2019. 13 pages. (WO2).

International Search Report and Written Opinion of the International Searching Authority, dated May 14, 2019, from International Application No. PCT/IB2019/051204, filed on Feb. 14, 2019. 15 pages. (WO3).

International Search Report and Written Opinion of the International Searching Authority, dated Jul. 12, 2019, from International Application No. PCT/IB2019/051205, filed on Feb. 14, 2019. 23 pages. (WO4).

International Search Report and Written Opinion of the International Searching Authority, dated Jun. 12, 2019, from International Application No. PCT/IB2019/051206, filed on Feb. 14, 2019. 13 pages. (WO5).

International Search Report and Written Opinion of the International Searching Authority, dated Jun. 14, 2019, from International Application No. PCT/IB2019/051207, filed on Feb. 14, 2019. 13 pages. (WO6).

International Search Report and Written Opinion of the International Searching Authority, dated May 31, 2019, from International Application No. PCT/IB2019/051208, filed on Feb. 14, 2019. 18 pages. (WO7).

International Search Report and Written Opinion of the International Searching Authority, dated Jul. 23, 2019, from International Application No. PCT/IB2019/051209, filed on Feb. 14, 2019. 20 pages. (WO8).

International Search Report and Written Opinion of the International Searching Authority, dated May 24, 2019, from International Application No. PCT/IB2019/051210, filed on Feb. 14, 2019. 15 pages. (WO9).

Partial Search Report dated Apr. 24, 2019, from International Application No. PCT/IB2019/051202, filed on Feb. 14, 2019. 14 pages. (WO1).

Partial Search Report dated May 17, 2019, from International Application No. PCT/IB2019/051205, filed on Feb. 14, 2019. 13 pages. (WO4).

Partial Search Report dated May 31, 2019, from International Application No. PCT/IB2019/051209, filed on Feb. 14, 2019. 12 pages. (WO8).

International Preliminary Report on Patentability dated Aug. 27, 2020 from International Application No. PCT/IB2019/051202, filed Feb. 14, 2019. 14 pages. (WO1).

International Preliminary Report on Patentability dated Aug. 27, 2020, from International Application No. PCT/IB2019/051203, filed on Feb. 14, 2019. 7 pages. (WO2).

International Preliminary Report on Patentability dated Aug. 27, 2020, from International Application No. PCT/IB2019/051204, filed on Feb. 14, 2019. 9 pages. (WO3).

International Preliminary Report on Patentability dated Aug. 27, 2020, from International Application No. PCT/IB2019/051205, filed on Feb. 14, 2019. 23 pages. (WO4).

International Preliminary Report on Patentability dated Aug. 27, 2020, from International Application No. PCT/IB2019/051206, filed on Feb. 14, 2019. 8 pages. (WO5).

International Preliminary Report on Patentability dated Aug. 27, 2020, from International Application No. PCT/IB2019/051207, filed on Feb. 14, 2019. 8 pages. (WO6).

International Preliminary Report on Patentability dated Aug. 27, 2020, from International Application No. PCT/IB2019/051208, filed on Feb. 14, 2019. 12 pages. (WO7).

International Preliminary Report on Patentability dated Aug. 27, 2020, from International Application No. PCT/IB2019/051209, filed on Feb. 14, 2019. 12 pages. (WO8).

International Preliminary Report on Patentability dated Aug. 27, 2020, from International Application No. PCT/IB2019/051210, filed on Feb. 14, 2019. 9 pages. (WO9).

* cited by examiner

GUNSHOT DETECTION SYSTEM ANTI-TAMPERING PROTECTION

RELATED APPLICATIONS

This application is a § 371 National Phase Application of International Application No. PCT/IB2019/051206, filed on Feb. 14, 2019, which claims the benefit under 35 USC 119(e) of U.S. Provisional Application No. 62/631,296, filed on Feb. 15, 2018, and U.S. Provisional Application No. 62/637,161, filed on Mar. 1, 2018, all of which are incorporated herein by reference in their entirety.

This application is related to:

International Application number PCT/IB2019/051202 filed Feb. 14, 2019, entitled "Gunshot detection system with forensic data retention, live audio monitoring, and two-way communication," now International Patent Publication No.: WO 2019/159098;

International Application number PCT/IB2019/051203 filed on Feb. 14, 2019, entitled "Gunshot detection system with master slave timing architecture," now International Patent Publication No.: WO 2019/159099;

International Application number PCT/IB2019/051204 filed on Feb. 14, 2019, entitled "Gunshot detection system with encrypted, wireless transmission," now International Patent Publication No.: WO 2019/159100;

International Application number PCT/IB2019/051205 filed on Feb. 14, 2019, entitled "Gunshot detection system with building management system integration," now International Patent Publication No.: WO 2019/159101;

International Application number PCT/IB2019/051207 filed on Feb. 14, 2019, entitled "Gunshot detection system with ambient noise modeling and monitoring," now International Patent Publication No.: WO 2019/159103;

International Application number PCT/IB2019/051208 filed on Feb. 14, 2019, entitled "Gunshot detection system with fire alarm system integration," now International Patent Publication No.: WO 2019/159104;

International Application number PCT/IB2019/051209 filed on Feb. 14, 2019, entitled "Gunshot detection sensors incorporated into building management devices," now International Patent Publication No.: WO 2019/159105; and International Application number PCT/IB2019/051210 filed on Feb. 14, 2019, entitled "Gunshot detection system with location tracking," now International Patent Publication No.: WO 2019/159106.

All of the afore-mentioned applications are incorporated herein by this reference in their entirety.

BACKGROUND OF THE INVENTION

Shooting incidents, involving active shooters shooting victims within buildings such as schools or malls, are increasingly a concern. Identifying and reacting quickly to such incidents can reduce loss of life. For example, first responders need to know if gunshots have actually been fired and the location and number of the fired shots.

In confined areas, such as in a school or a private or public building, detecting and locating the source of gunshots is a complicated problem. A gunshot typically generates several sounds including the gunshot itself, the bullet's bow shockwave, noise from bullet impacts and noise of reflected gunshot sounds. In addition, numerous noises are generated in buildings that may be mistakenly identified as gunshots.

The broad concept of detecting gunshots utilizing acoustics is known. More specifically, it is known to provide a gunshot detection system including an array of acoustic sensors positioned in a pattern which enables signals from the sensors to be employed to not only detect the firing of a gunshot but to also locate the origin of the shot. One main requirement of such a system is the need to accurately distinguish between the sound produced from a gunshot and a host of other ambient sounds. In at least one known arrangement, a microphone is used to detect each sound, which is then amplified, converted to an electrical signal and then the electrical signal is compared with a threshold value above which a gunshot sound is expected to exceed.

Recently, gunshot detection systems with improved accuracy, dependability, and effectiveness have been described. One such system is described in International Publication Number WO 2018/044553, published on Mar. 8, 2018 and entitled "System and Method for Acoustically Identifying Gunshots Fired Indoors." This system provides for low false alarms or false positives and high detection rates by employing two microelectromechanical microphones (MEMs) having different sensitivity levels. Acoustic signals from a first microphone with lower sensitivity (for example, making the anomaly detection microphone essentially deaf to routine sounds) are first analyzed for a peak amplitude level large enough to be a potential gunshot. Then acoustic signals from a second microphone having a higher sensitivity are then analyzed further to confirm that the sound was a gunshot.

Gunshot detection methods have also been proposed that can count the number of gunshots fired, particularly from an automatic or fast acting weapon. One such method is described in International Publication Number WO 2018/044556, published on Mar. 8, 2018 and entitled "Method for Acoustically Counting Gunshots Fired Indoors." In this method, an acoustic signature of captured noise is analyzed to accurately count how many shots are fired. The method can be employed to identify that the gun is an automatic or rapid fire weapon, which information can be provided to emergency personnel.

Additionally, gunshot detection system that can accurately determine where sensed events are located have been proposed. One such system is described in International Publication Number WO 2018/185723, published on Oct. 11, 2018 and entitled "System and Method for Identifying and Locating Sensed Events." Here, a sensor network is employed to detect an event in the form of an audible signal. The event is time stamped and sent to a controller, which evaluates the event as either unique or a multiple detection using the sensor's time of alarm to determine which sensor activated first and to suppress subsequent alarms for the same event. This process is known as de-confliction.

SUMMARY OF THE INVENTION

Features can be added to these gunshot detection systems to make them more useful and robust in a wider range of contexts. For example, it would be beneficial for these systems to be able to detect physical tampering and/or software hacking attempts upon the sensors.

The presently disclosed gunshot detection system provides anti-tampering protection for gunshot sensor units and/or the control panel preferably at both a hardware and a software level. A command and control application execution on the control panel monitors for any changes to the configuration settings for the gunshot detection system, including the control panel and the individual gunshot sensor units. When the settings are changed, even by an authorized user, the control panel generates a tampering alert and sends the alert to administrative users. The alert can also be presented to a current operator of the control panel. The alert might indicate that the settings have been changed to non-standard settings, among other examples.

The present invention can cover a number of use cases. In one example, an individual might hack into one of the gunshot sensor units and change the configuration settings. In this scenario, the command and control application receives an alert from the gunshot sensor unit. The application, in turn, alerts the administrative users and/or operators. A similar notification might also occur when a sensor is taken offline to alert the user to a possible tampering event.

In general, according to one aspect, the invention features a system for detecting gunshots. The system comprises gunshot sensor units and a control panel. The gunshot sensor units detect gunshots, and, via a controller, generate event data for the detected gunshots. The control panel receives the event data and monitors configuration settings for both the control panel and the gunshot sensor units.

In embodiments, the control panel might generate tampering alerts for the control panel and/or the gunshot sensor units based on the monitored configuration settings and/or a tampering alert policy stored in nonvolatile memory. For example, the control panel could detect changes to the configuration settings and generate tampering alerts based on the changed configuration settings. In this case, the control panel could store standard configuration settings and generate the alerts based on a comparison of the changed configuration settings to the standard configuration settings.

In general, according to another aspect, the invention features an anti-tampering method for a gunshot detection system in which gunshot sensor units detect gunshots and generate event data based on the detected gunshots, and a control panel receives the event data. The configuration settings for the gunshot sensor units the control panel are monitored (e.g. for changes indicative of tampering).

In general, according to another aspect, the invention features a system for detecting gunshots. The system comprises gunshot sensor units and a control panel. The gunshot sensor units detect gunshots and generate event data for the detected gunshots. The control panel receives the event data and monitors for tampering events for the gunshot sensor units.

In embodiments, the control panel might monitor for tampering events based on machine certificates for the gunshot sensor units, which could be stored in nonvolatile memory by the gunshot sensor units themselves and/or by the control panel. The gunshot sensor units might sign the event data using the machine certificates, for example, by computing one-way hashes of the machine certificates and/or a predetermined reference number. The control panel would monitor for the tampering events based on the signed event data (e.g. by independently computing the one-way hashes). The control panel would generate tampering alerts for the gunshot sensor units in response to detecting any tampering events.

In general, according to another aspect, the invention features a method for detecting gunshots, comprising monitoring for tampering events for gunshot sensor units, which detect gunshots and generate event data for the detected gunshots.

In general, according to another aspect, the invention features a system for detecting gunshots. The system comprises gunshot sensor units and a control panel. The gunshot sensor units detect gunshots and generate gunshot event data for the detected gunshots. The gunshot sensor units also include anti-tamper sensors for detecting manipulation of housings for the gunshot sensor units, generating tampering event data based on any detected manipulation by the anti-tamper sensors. The control panel receives the gunshot event data and the tampering event data and generates tampering alerts based on the tampering event data.

In general, according to another aspect, the invention features a method for detecting gunshots, which are detected by gunshot sensor units that generate event data for the detected gunshots. Manipulation of housings of the gunshot sensor units is detected via anti-tamper sensors of the gunshot sensor units. Tampering event data is generated based on the detected manipulation. The gunshot event data and the tampering event data are received, and tampering alerts are generated based on the tampering event data.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
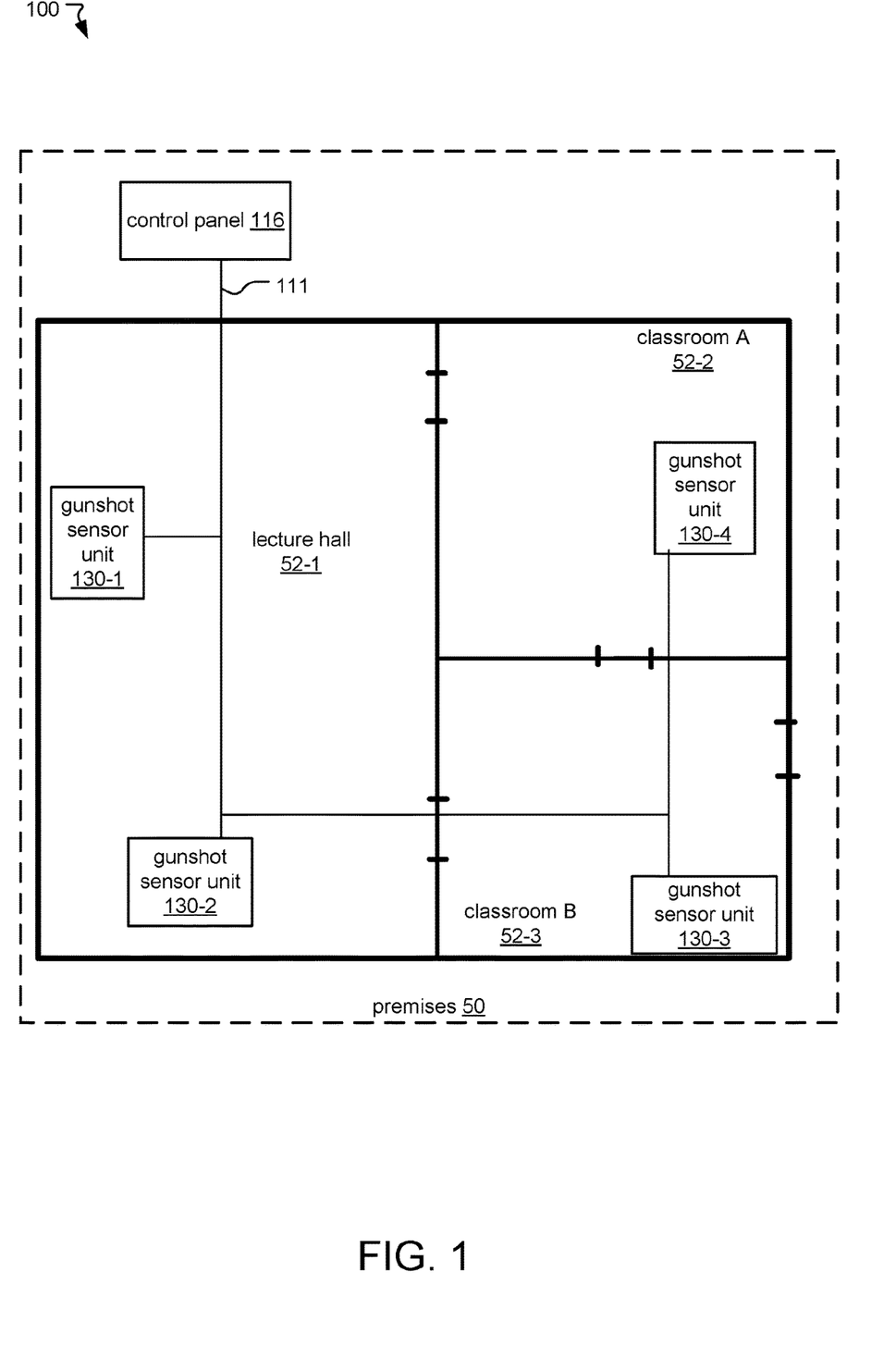
FIG. 1 is a schematic diagram of an exemplary gunshot detection system showing a common context for embodiments of the present invention.

FIG. 1 is a schematic diagram of an exemplary gunshot detection system 100.

In general, the gunshot detection system 100 monitors, detects and reports the occurrence of gunshots or other emergencies within a premises 50 such as a building (e.g. office, hospital, warehouse, retail establishment, shopping mall, school, multi-unit dwelling, government building).

In the illustrated example, the premises 50 is a simplified floor example of a building with three areas 52, a lecture hall 52-1, classroom A 52-2, and classroom B 52-3. Two gunshot sensor units 130-1, 130-2 are located in the lecture hall 52-1, while one gunshot sensor unit 130-2 is located in classroom A 52-2, and one gunshot sensor unit 130-3 is located in classroom B 52-3.

In the illustrated embodiment, the gunshot detection system 100 includes gunshot sensor units 130, a control panel 116, and a communication network 111. In general, and in one configuration, the gunshot sensor units 130 detect conditions indicative of the gunshots or other emergencies and alert the control panel 116, which takes one or more responsive actions such as alerting building personnel, law enforcement, and/or a monitoring center, or collecting and presenting data pertaining to the detected gunshots to an operator of the control panel 116. The gunshot sensor units 130 and the control panel 116 communicate over the communication network 111.

More specifically, the gunshot sensor units 130 are distributed throughout the premises 50, for example, in areas 52 of the premises such as rooms, hallways, lobbies or stairways, to name a few examples. The gunshot sensor units 130 detect acoustic anomalies indicating potential gunshots and generate audio data depicting the acoustic anomalies. The gunshot sensor units 130 also generate event data based on and descriptive of the acoustic anomalies and locally store and/or send the event data to the control panel 116.

The event data often includes: audio data (e.g. digitized audio clips) depicting the acoustic anomalies and metadata. This metadata includes, for example, time information indicating when the acoustic anomalies started and/or stopped, duration information for the acoustic anomalies and/or the audio data depicting the acoustic anomalies, file information, and identification information for the gunshot sensor unit 130 that detected the anomaly; and other sensor data generated by the gunshot sensor unit.

On the other hand, the control panel 116 directs the overall functionality of the gunshot detection system 100 by sending instructions (e.g. control messages) to be executed by the gunshot sensor units 130, receiving the event data from the gunshot sensor units 130 and taking the responsive actions based on the event data. The control panel 116 might receive preliminary event data (e.g. metadata indicating time and date information) from multiple gunshot sensor units 130 and perform a de-confliction process in order to determine which event data from the different sensor units 130 pertains to the same detected acoustic anomaly and which of the gunshot sensor units 130 is closest to the source of the acoustic anomaly based on, for example, which of the units first detected the acoustic anomaly. The control panel 116 might then send instructions to the gunshot sensor unit 130 closest to the source to send full event data (e.g. including a full audio data sample, environmental data, and other sensor data) to the control panel 116 for further processing and/or to be presented to the operator.

In general, the control panel 116 also monitors for tampering events throughout the gunshot detection system 100.

In one example, the control panel 116 monitors configuration settings for the gunshot sensor units 130 and the control panel 116. These configuration settings, which might be stored by the control panel 116 and/or the gunshot sensor units 130, determine the behavior of the devices in different situations based on input received from an operator 107, for example, via a user interface of the control panel 116. The control panel 116 can detect changes to the configuration settings of the gunshot sensor units 130 in a number of ways, including receiving messages from the gunshot sensor units 130, which would be configured to automatically notify the control panel 116 of any changes. In one example, the configuration settings for the gunshot sensor units 130 could be mirrored or stored in parallel on the control panel 116 and synchronized with the gunshot sensor units 130 on a continuous basis. In another example, the configuration settings could be stored by the control panel 116 and the control panel 116 controls the gunshot sensor units 130 based on the configuration settings. As changes to these configuration settings could be indicative of tampering, the control panel 116 generates tampering alerts in response to detecting changes to the configuration settings.

In other examples, the control panel 116 monitors for tampering events based on machine certificates for the gunshot sensor units 130 and/or based on sensors of the gunshot sensor units 130 indicating physical tampering with a housing for the unit.

Figure 2:
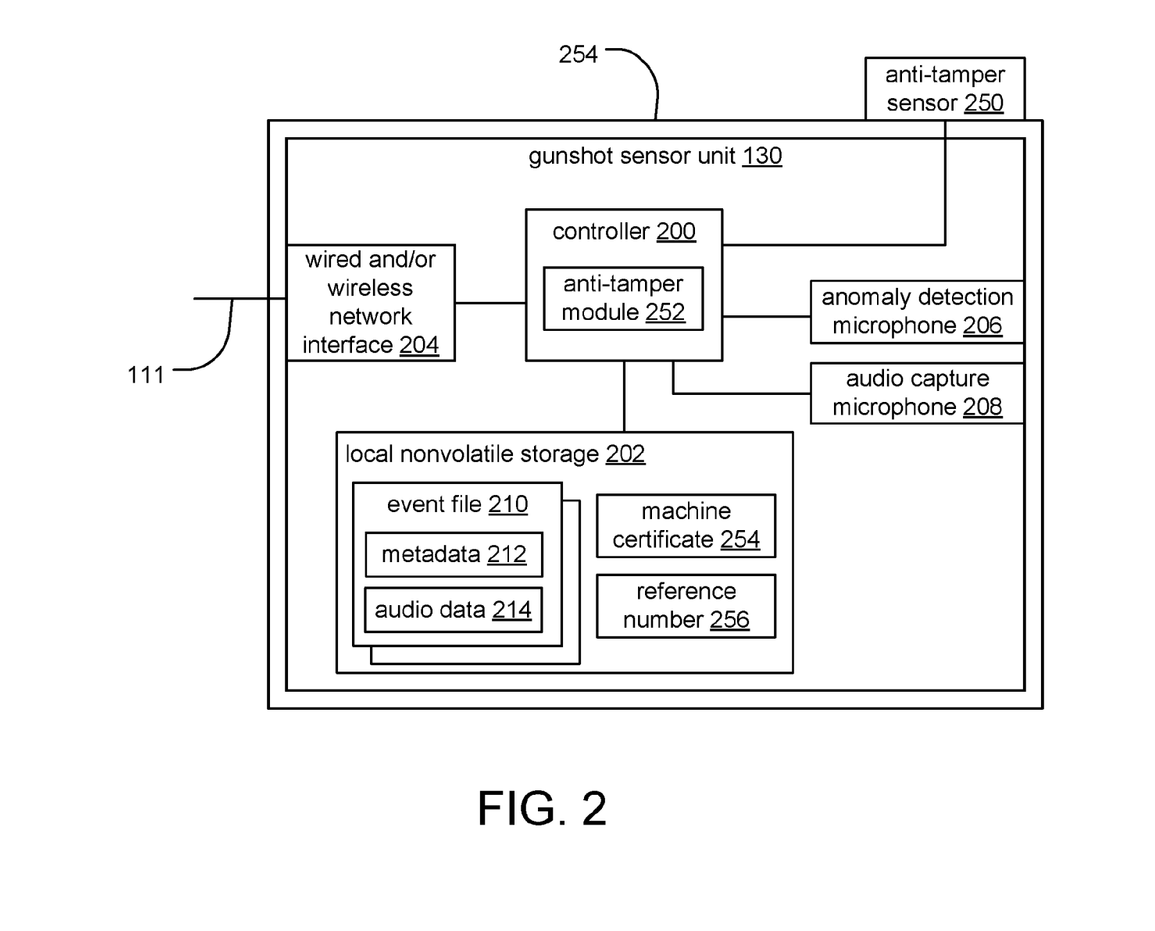
FIG. 2 is a block diagram showing an exemplary gunshot sensor unit of the gunshot detection system according to the present invention.

FIG. 2 is a block diagram showing an exemplary gunshot sensor unit 130.

The gunshot sensor unit 130 includes a controller 200, local nonvolatile storage 202, a wired and/or wireless network interface 204, a housing 254, an anomaly detection microphone 206, an audio capture microphone 208, and an anti-tamper sensor 250.

The housing 254 is a casing that encloses and protects components of the gunshot sensor unit 130. The housing 254 might be a rigid material, such as plastic, to which circuitry of the gunshot sensor unit 130 is mounted. In turn, the housing 254 is then mounted into position, for example, by screwing it to a wall or ceiling of the premises 50.

The controller 200 executes firmware/operating system instructions and generally directs the functionality of the gunshot sensor unit 130 based in part on the configuration settings for the gunshot sensor unit 130. In one example, the controller 200 is small single-board computer. In other examples, the controller is a microcontroller unit or a system on a chip (SoC), including one or more processor cores along with memory and programmable input/output peripherals such as analog to digital converts and digital to analog converters.

An anti-tamper module 252 executing on the controller 200 provides anti-tamper capability for the gunshot sensor unit 130. In general, the anti-tamper module 252 notifies the control panel 116 of any changes to the configuration settings for the gunshot sensor unit 130, digitally signs the event data and sends the signed event data to the control panel 116, and detects physical intrusions and/or tampering detected via the anti-tamper sensor 250, generates tampering event data based on the detected tampering and sends the tampering event data to the control panel 116.

More specifically, the anti-tamper sensor 250 is installed on the housing 254 of the gunshot sensor unit 130 and configured to detect manipulation and/or opening of the housing 254 and sends an indication to the controller 200 in response to detecting the manipulation and/or opening. In this way, the anti-tamper sensor 250 detects attempted physical access upon the housing 254 of the gunshot sensor unit 130.

Stored in local nonvolatile storage 202 are a machine certificate 254 and a reference number 256. In general, the machine certificate 254 includes credentials for the gunshot sensor unit 130. The reference number is an arbitrary value known to the control panel 116. The anti-tamper module 252 digitally signs the event data based on the machine certificate 254 and the reference number 256 and sends the signed event data to the control panel 116.

More specifically, in one embodiment, the machine certificate 254 might include credentials and/or identification information for the gunshot sensor unit 130 such as a globally unique identifier. The machine certificate 254 would be stored both by the gunshot sensor unit 130 and known to the control panel 116. Additionally, the control panel 116 might continually generate and distribute an updated reference number 256 to the gunshot sensor units 130. The anti-tamper module 252 signs the event data by computing a one-way hash of the machine certificate 254 and the reference number 256 using an algorithm known to the control panel 116. This one-way hash would be included with the signed event data sent to the control panel 116.

In another embodiment, the machine certificate 254 could be a private encryption key associated with the gunshot sensor unit 130, a public counterpart of which would be known to the control panel 116. In this case, the anti-tamper module 252 would sign the event data by generating a signature based on the event data, the reference number 256 and the private key using a signing algorithm. This signature could then be verified by the control panel 116 to ensure that the event data came from the gunshot sensor unit 130 and that the data itself was not altered.

Additionally, the anti-tamper module 252 might execute on a secure cryptoprocessor, which also stores the machine certificate 254 and the reference number 256, as an additional layer of anti-tampering protection.

The wired and/or wireless network interface 204 provides connectivity with the control panel 116 and possibly other devices via the communication network 111. In addition, the network also provides power to the devices, in many examples. Direct current (DC) is superimposed upon the data that is transmitted between the devices and other nodes on the network.

The anomaly detection microphone 206 detects the acoustic anomalies, while the audio capture microphone 208 captures ambient sound and generates the audio data. In one embodiment, both microphones 206, 208 are micro electromechanical system (MEMS) microphones having different sensitivity levels, and the controller 200 is configured to sample the microphones 206, 208 such that outputs from the microphones can be continuously analyzed in near real time for an acoustic signature. The anomaly detection microphone 206 has the lower sensitivity level and a high clipping level, while the audio capture microphone 208 has the higher sensitivity level. The audio capture microphone 208 continuously captures ambient sound, which is stored in a 9.9 second (for example) loop in a ring buffer of the controller 200. At the same time, incoming acoustic signals from the anomaly detection microphone 206 are continuously analyzed to detect acoustic anomalies, particularly by searching the incoming acoustic signal for a peak amplitude level large enough to be at least preliminarily identified as a gunshot.

Once an indication of a possible gunshot has been triggered utilizing the anomaly detection microphone 208, further processing may be performed by the controller 200. The controller 200 analyzes the sound stored in the loop to confirm that the acoustic anomaly is a gunshot. If confirmed as gunshot, the controller stores the captured sound stored in the loop buffer, which would include the acoustic anomaly and the previously captured sound (up to 9.9 seconds, in this example) as audio data 214 in the local nonvolatile storage 202 associated with different event files 210 or instances of event data for different gunshot detection events, along with the metadata 212, which includes the time and/or data information for the events. In embodiments, the local nonvolatile storage 202 could be fixed storage such as flash memory, or removable storage such as an SD card, among other examples.

Figure 3:
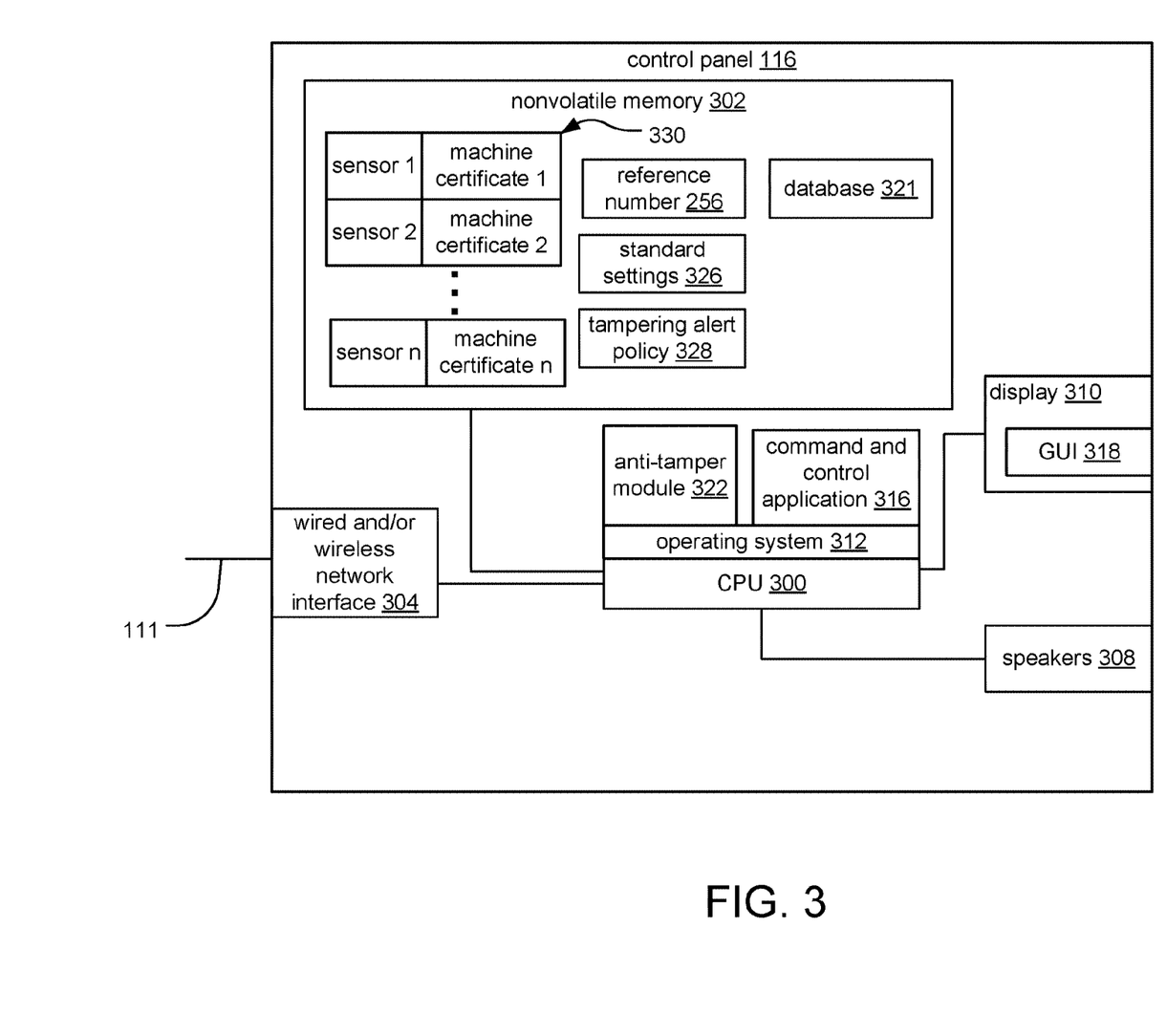
FIG. 3 is a block diagram showing an exemplary control panel of the gunshot detection system according to the present invention.

FIG. 3 is a block diagram showing an exemplary control panel 116.

The control panel 116 includes a central processing unit (CPU) 300, nonvolatile memory 302, a wired and/or wireless network interface 304, a display 310, and an encryption/decryption module 301.

Similar to analogous components on the gunshot sensor units 130, the wired and/or wireless network interface 304 provides connectivity with the gunshot sensor units 130 and possibly other devices via the communication network 111. In some examples, the control panel may also supply power to the units.

The speakers 308 provide audio playback of streamed audio data from the gunshot sensor units 130. The audio data can be the locally stored audio data 214 depicting the acoustic anomalies or can be captured and streamed live for live monitoring of the ambient sound in the area 52 where the gunshot sensor unit 130 is located.

Stored in the nonvolatile memory 302 are the machine certificates 330 for each of the gunshot sensor units 130, the reference number 256, standard configuration settings 326, a tampering alert policy 328 and a gunshot event database 321.

The machine certificates 330 stored by the control panel 116 might simply be local copies of the machine certificates 254 stored by the gunshot sensor units 130, or they could be public key counterparts to private keys stored by the gunshot sensor units 130, among other examples.

The standard configuration settings 326 include information about normal expected behaviors and configuration settings for the control panel 116 and/or the gunshot sensor units 130 (as opposed to suspicious, unexpected behaviors and settings that might be indicative of tampering).

The tampering alert policy 328 includes configuration information indicating when and how the control panel 116 generates tampering alerts. This information might define different events indicative of tampering such as detected changes to the configuration settings, failure to verify the signed event data, receipt of tampering event data generated via the anti-tamper sensors 250 of the gunshot sensor units 130, and/or suspicious behavior or commands, among other examples. Different combinations of these tampering events might then be associated with different notification actions to be performed by the control panel 116 when it generates the tampering alerts. For example, a tampering event defined as a lower priority by the tampering alert policy 328 might cause the control panel 116 to generate an alert by simply flagging event data generated by the gunshot sensor unit 130, whereas a tampering event defined as a higher priority might send and/or present alert messages to operators 107 of the control panel 116 and/or other users and administrators of the gunshot detection system 100, or even to sound an audible alarm, among other examples.

The gunshot event database 321 stores information about the gunshot detection system 100. This information includes information about the devices of the gunshot detection system 100 including identification information and location information for each of the gunshot sensor units 130. The gunshot event database 321 also stores event data, audio data, any generated audio, event and/or environmental data analytics information, such as forensic data generated as a result of processing the data received from the gunshot sensor units 130, or order information indicating the order in which the gunshot sensor units 130 detected the gunshots. In the illustrated example, the gunshot event database 321 is stored in the nonvolatile memory 302 of the control panel 116. However, in other examples, the gunshot event database 321 might be part of a cloud management system and/or connected services system, which is accessible only over public networks, or even on the local nonvolatile storage 202 of the gunshot sensor units 130 themselves.

The CPU 300 executes firmware instructions and an operating system (OS) 312 and generally directs the functionality of the control panel 116. The OS 312 interfaces with the hardware components of the control panel 116 for access by a command and control application 316, which is a software process executing on top of the OS 312.

The command and control application 316, in general, controls the gunshot sensor units 130, maintains the gunshot event database 321, and provides a graphical user interface (GUI) 318 that is rendered on the display 310 (e.g. touchscreen display) of the control panel 116. In one example, the GUI 318 might present gunshot sensor unit information to an operator of the control panel 116 and receive input indicating selections of various options for controlling the gunshot sensor units 130 such as programming and distributing the machine certificates 254 for the gunshot sensor units 130, resetting and/or redistributing the reference number 256, presenting the audio data (e.g. via the speakers 308), taking certain actions in response to detecting tampering, and/or specifying various configuration settings including the standard configuration settings 326 and the tampering alert policy 328.

An anti-tamper module 322 also executes on the CPU 300. The anti-tamper module 322 might be part of the command and control application 316 or perform operations in conjunction and/or communication with the command and control application 316.

In general, the anti-tamper module 322 monitors for tampering events for the gunshot sensor units 130 and/or the control panel 116. The anti-tamper module 322 might monitor for changes to configuration settings for the gunshot sensor units 130, for example, based on receiving messages from the gunshot sensor units 130 indicating these changes and comparing the changes to the standard configuration settings 326. The anti-tamper module 322 might also monitor all commands or operations performed by the gunshot sensor units 130 and detect behaviors indicative of tampering such as commands instructing the gunshot sensor unit 130 to disable its encryption and/or delete all event files 210 within its local nonvolatile storage 202. In another example, the anti-tamper module verifies the signed event data received from the gunshot sensor units 130 by independently calculating a one-way hash of the locally stored machine certificate 330, the reference number 256 and/or the event data itself and comparing the independently calculated one-way hash to the signature of the signed event data. In another example, the anti-tamper module 322 monitors for incoming tampering event data generated via the anti-tamper sensors 252 of the gunshot sensor units 130. In yet another example, the anti-tamper module 322 records checksums and other fingerprinting information associated with the machine certificates of the gunshot sensor units 130 and deconfliction algorithms at startup, and periodically compares the recorded values to current values for the same components. Any changes indicate a likely tampering event (e.g. software hacking attempt) at the level of the gunshot sensor units 130, rather than the change being initiated by the control panel 116. In yet another example, the anti-tamper module 322 monitors the messages received at the network interface 304 to determine if the messages were sent from a trusted source and that messages/signals received at each gunshot sensor unit 130 were sent from trusted sources. The anti-tamper module 322 could even detect tampering events based on whether the gunshot sensor unit 130 is connected to the network 111, responsive to the control panel 116 and/or powered on.

The anti-tamper module 322 also generates tampering alerts based on detected tampering events and the settings defined in the tampering alert policy 328. These alerts could be in many different forms, including presenting the alerts to the operator 107 of the control panel 116 via the display 310, emitting audible alert messages and/or sounds via the speakers 308, sending emails and/or text message notifications to the operator 107 and/or administrators and users of the gunshot detection system 100, or even sending push notifications to mobile computing devices of the operators 107 and users.

Additionally, in some embodiments, the anti-tamper module 322 sends alerts to law enforcement (e.g. via user interfaces of devices operated by law enforcement entities or other authorized personnel) that tampering was detected. The module 322 then additionally sends instructions to video surveillance systems installed in the premises 50 to direct surveillance cameras toward the area 52 containing the gunshot sensor units 130 being tampered with, potentially capturing video evidence of the tampering and/or presenting image data to technicians, security personnel and/or law enforcement officers depicting the tampering.

Figure 4:
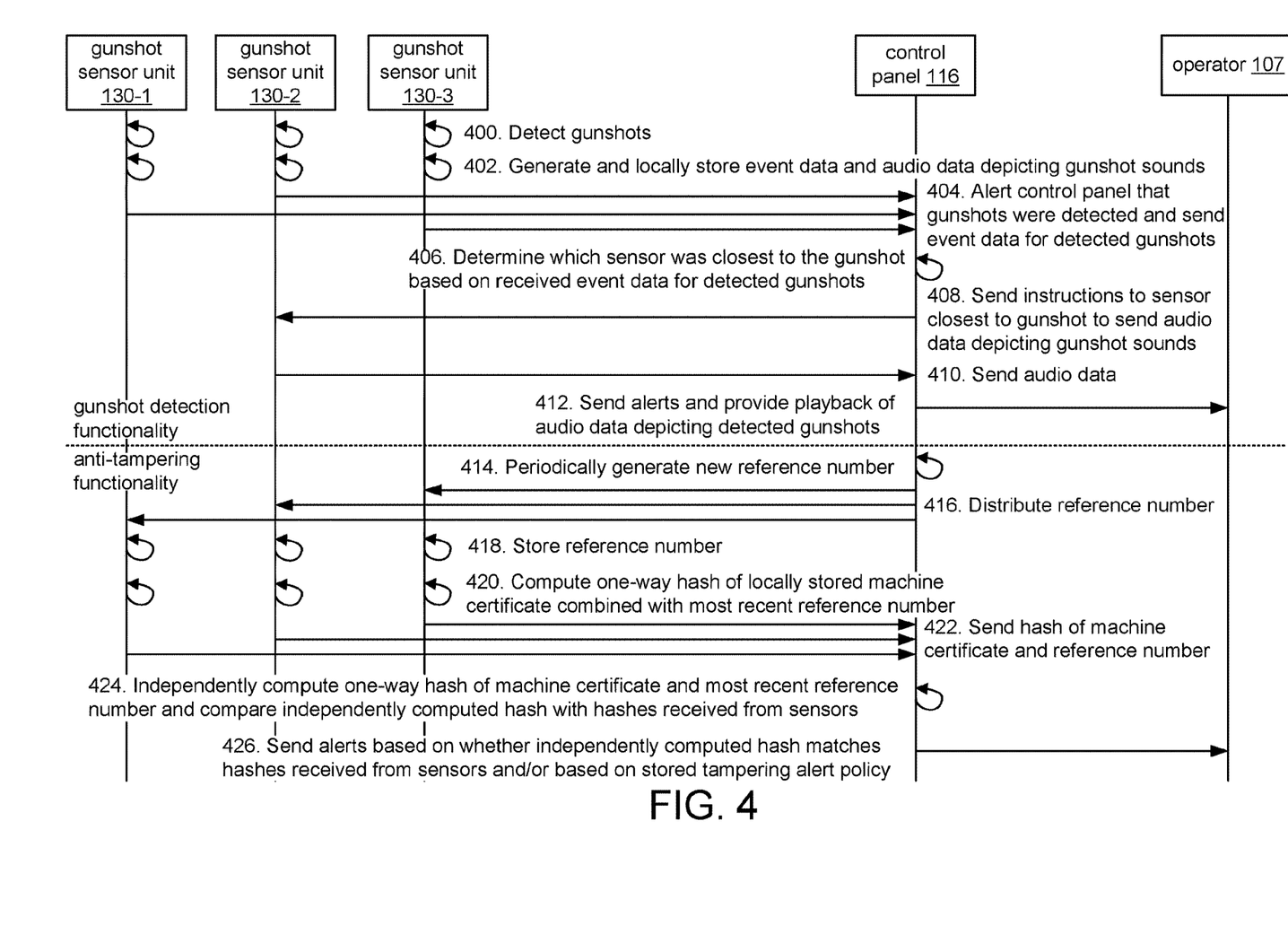
FIG. 4 is a sequence diagram illustrating a process by which the control panel monitors for tampering events using machine certificates associated with the gunshot sensor units.

FIG. 4 is a sequence diagram illustrating a process by which the control panel 116 monitors for tampering events using the machine certificates associated with the gunshot sensor units 130. For the purpose of clarity, the gunshot detection functionality and the anti-tampering functionality of the gunshot detection system 100 are described separately. Steps 400 through 412 describe the gunshot detection functionality, while steps 414 through 426 describe the anti-tampering functionality. It should be noted that, during normal operation of the gunshot detection system 100, the ordering of the two functions could be reversed, or the two functions could be performed in parallel and/or combined, for example, during a shooting event in which tampering events could also be occurring.

First, in step 400, one or more of the gunshot sensor units 130 detect gunshots. The gunshot sensor units 130 detect acoustic anomalies indicative of the gunshot via the anomaly detection microphones 206, for example, by searching the incoming acoustic signal from the anomaly detection microphone 206 for a peak amplitude level large enough to be identified as a gunshot.

In step 402, the gunshot sensor units 130 generate event data, for example, by recording timestamps for the detected shots and audio data via the audio capture microphone 208. The gunshot sensor units 130 alert the control panel 116 that gunshots were detected and send the event data to the control panel 116 in step 404.

In step 406, the control panel 116 performs a de-confliction process and determines which gunshot sensor unit 130 was closest to the source of the acoustic anomaly based on the received event data. This process involves determining which event data received from the gunshot sensor units 130 pertain to the same acoustic anomalies and then determining which of the gunshot sensor units 130 detected each of the acoustic anomalies first (e.g. based on the metadata indicating the timing information for the gunshots).

In step 408, the control panel 116 sends instructions to the gunshot sensor unit 130-2 that was determined to be closest to the gunshots to send its full event data, including a full captured audio data sample depicting the gunshots and any ambient sound before and/or after the gunshots. In response, the gunshot sensor unit 130-2 sends the full event data including the full audio data sample to the control panel 116 in step 410.

In step 412, the control panel 116 alerts the operator 107 of the gunshots and provides audio playback of the audio data depicting the gunshots via the speakers 308. The control panel 116 might also take other responsive actions such as storing the event data in the database 321.

Turning to the anti-tampering functionality, in step 414, the control panel 116 periodically generates a new reference number 256, which is stored by the control panel 116 in the nonvolatile memory 302. In step 416, the control panel 116 distributes the reference number 256 to the gunshot sensor units 130, each of which store the reference number 256 to their local nonvolatile storage 202 in step 418.

In step 420, the gunshot sensor units 130 compute a one-way hash based on the locally stored machine certificate 254 combined with the most recent reference number 256. The resulting value could be included as a signature for the event data and/or audio data sent to the control panel 116 in steps 404 and 410. In this case, the event data itself could also be input into the one-way hash algorithm along with the machine certificate 254 and the reference number 256. In step 422, the gunshot sensor units 130 send the hash of the machine certificate 254 and the reference number 256 to the control panel 116, for example, in the form of signed event data and/or signed audio data.

In step 424, the control panel 116 independently computes the one-way hash, using the machine certificate 330 and the reference number 256 stored by the control panel 116. Here, the control panel 116 would be configured to use the same hashing algorithm as the gunshot sensor units 130 such that the resulting value should be identical to the one-way hash sent from the gunshot sensor unit 130. This independently computed hash is compared to the hash received from the gunshot sensor unit 130 in order to detect tampering. For example, if the values are not identical, the control panel 116 would determine that tampering has occurred. In one example, the control panel 116 could compute a one-way hash of the machine certificate 330, the reference number 256 and event data received from the gunshot sensor units 130 during a shooting event and compare the independently computed one-way hash to the signature included with the event data. In another example, the control panel 116 might use a public encryption/decryption key associated with the gunshot sensor unit 130 to verify the signature.

In step 426, the control panel 116 generates and sends tampering alerts to the operator 107 based on whether the independently computed hash matches the hash received from the gunshot sensor units 130. These alerts might be based on settings defined in the tampering alert policy 328.

Figure 5:
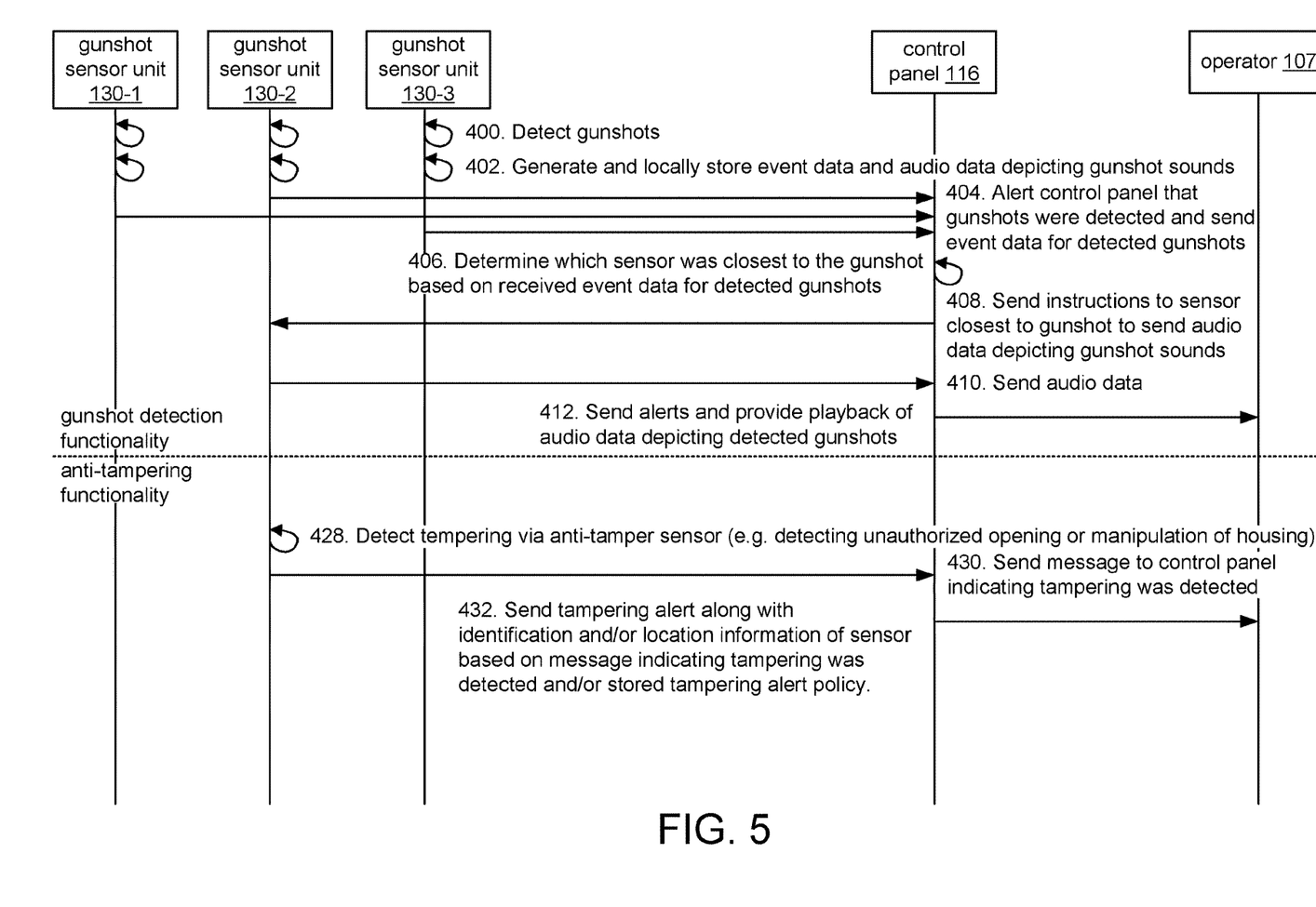
FIG. 5 is a sequence diagram illustrating a process by which tampering events are detected using an anti-tamper sensor of the gunshot sensor units.

FIG. 5 is a sequence diagram illustrating a process by which the gunshot sensor units detect tampering events via the anti-tamper sensor 250. As with FIG. 4, the gunshot detection functionality and the anti-tampering functionality of the gunshot detection system 100 are described separately. Steps 400 through 412 describe the gunshot detection functionality and remain unchanged with respect to FIG. 4, while steps 428 through 432 describe the anti-tampering functionality.

In step 428, the gunshot sensor unit 130-2 detects tampering via the anti-tamper sensor 250, which might detect unauthorized opening and/or manipulation of the housing 254 of the gunshot sensor unit 130, for example.

In step 430, the gunshot sensor unit 130-2 sends a message to the control panel 116 indicating that tampering was detected. This message might include tampering event data generated by the gunshot sensor unit 130-2 in response to detecting the opening and/or manipulation of the housing 254.

In step 432, in response to the message received from the gunshot sensor unit 130-2, the control panel 116 generates and sends a tampering alert to the operator 107. The tampering alert might include identification and/or location information (for example, retrieved from the database 321) for the gunshot sensor unit 130. Additionally, the tampering alert could also be generated based on the alert settings defined in the tampering alert policy 328.

Figure 6:
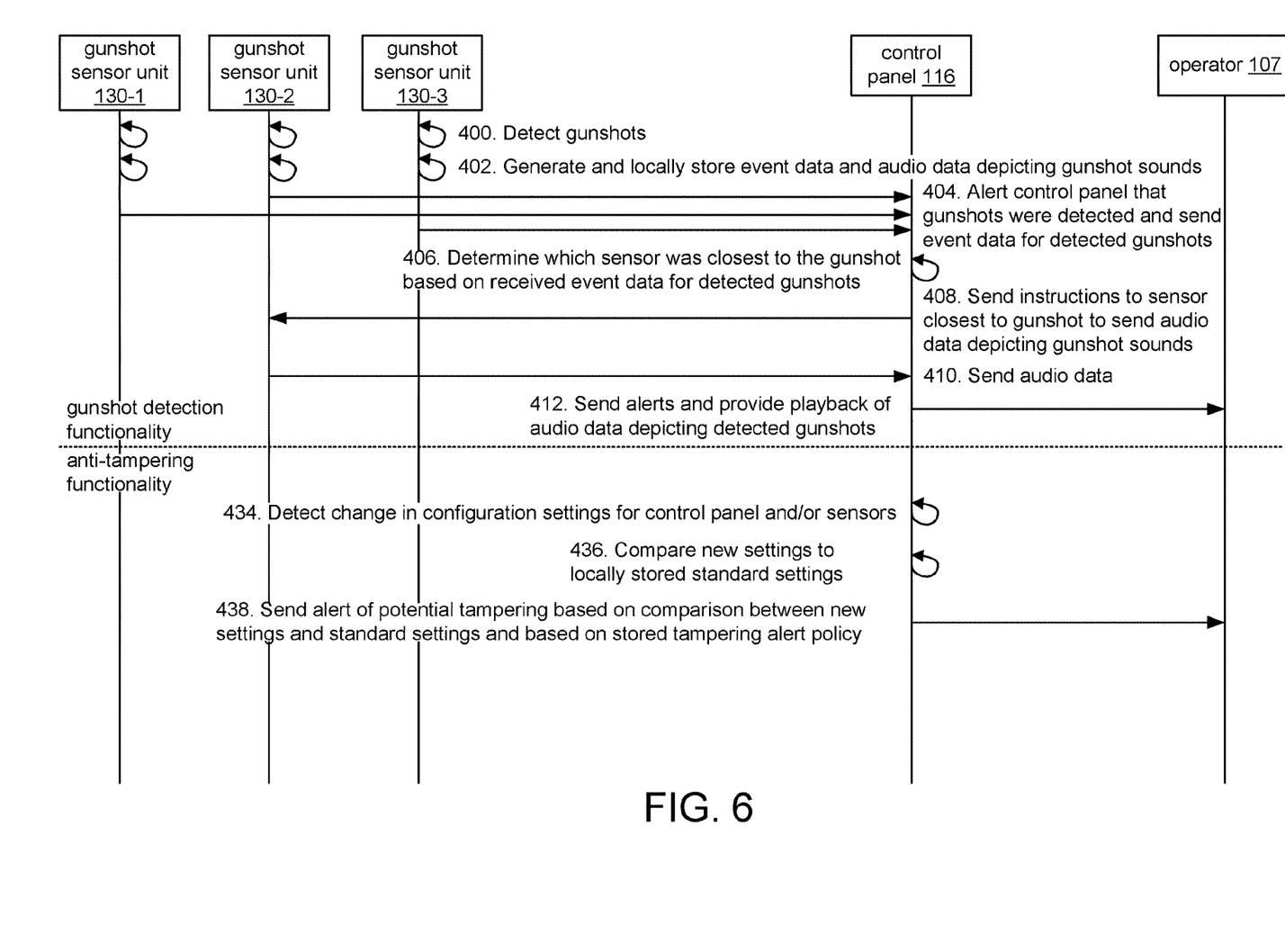
FIG. 6 is a sequence diagram illustrating a process by which the control panel detects tampering events by monitoring configuration settings for the gunshot sensor units and/or the control panel.

FIG. 6 is a sequence diagram illustrating a process by which the control panel detects tampering events by monitoring configuration settings. As with FIG. 4, the gunshot detection functionality and the anti-tampering functionality of the gunshot detection system 100 are described separately. Steps 400 through 412 describe the gunshot detection functionality and remain unchanged with respect to FIG. 4, while steps 434 through 438 describe the anti-tampering functionality.

In step 434, the control panel 116 detects changes to the configuration settings for the gunshot sensor units 130 and/or the control panel 116. The anti-tamper module 322 might monitor for the changes to the configuration settings for the gunshot sensor units 130, for example, based on receiving messages from the gunshot sensor units 130 indicating these changes. The anti-tamper module 322 might also monitor all commands or operations performed by the gunshot sensor units 130.

In step 436, the control panel 116 compares the changed configuration settings to the locally stored standard configuration settings 326, for example, to detect any suspicious configuration changes and/or behaviors.

In step 438, based on this comparison between the changed configuration settings and the standard configuration settings 326, the control panel 116 generates and sends tampering alerts to the operator 107. These alerts would also be based on the stored tampering alert policy 328.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for detecting gunshots, the system comprising:
   gunshot sensor units for detecting gunshots, each of the gunshot sensor units comprising a controller for generating event data for the detected gunshots; and
   a control panel for receiving the event data, the control panel monitoring configuration settings for the gunshot sensor units and the control panel, wherein the control panel monitors for tampering events for the gunshot sensor units based on machine certificates for the gunshot sensor units and the gunshot sensor units sign the event data using the machine certificates by computing one-way hashes of the machine certificates and/or a predetermined reference number, and the control panel monitors for the tampering events by independently computing the one-way hashes.

2. The system as claimed in claim 1, wherein the control panel generates tampering alerts for the control panel and/or the gunshot sensor units based on the monitored configuration settings.

3. The system as claimed in claim 1, wherein the control panel detects changes to the configuration settings for the gunshot sensor units and the control panel.

4. The system as claimed in claim 3, wherein the control panel generates tampering alerts for the control panel and/or the gunshot sensor units based on the changed configuration settings.

5. The system as claimed in claim 3, wherein the control panel comprises nonvolatile memory for storing standard configuration settings for the gunshot sensor units and the control panel, and the control panel generates tampering alerts for the control panel and/or the gunshot sensor units based on a comparison of the changed configuration settings and the standard configuration settings.

6. The system as claimed in claim 1, wherein the control panel comprises nonvolatile memory for storing a tampering alert policy, and the control panel generates tampering alerts for the control panel and/or the gunshot sensor units based on the tampering alert policy and the monitored configuration settings.

7. An anti-tampering method for a gunshot detection system, the method comprising:
   monitoring configuration settings for gunshot sensor units of the gunshot detection system and a control panel of the gunshot detection system,
   wherein the gunshot sensor units detect gunshots and generate event data based on the detected gunshots, and the control panel receives the event data and wherein the control panel monitors for tampering events based on machine certificates for the gunshot sensor units and the gunshot sensor units signing the event data using the machine certificates and monitoring for the tampering events by independently computing one-way hashes of the machine certificates and/or a predetermined reference number, the one-way hashes being computed by the gunshot sensor units to sign the event data.

8. The method as claimed in claim 7, wherein the control panel generates tampering alerts for the control panel and/or the gunshot sensor units based on the monitored configuration settings.

9. The method as claimed in claim 7, wherein the control panel detects changes to the configuration settings for the gunshot sensor units and the control panel.

10. The method as claimed in claim 9, wherein the control panel generates tampering alerts for the control panel and/or the gunshot sensor units based on the changed configuration settings.

11. The method as claimed in claim 9, wherein the control panel comprises nonvolatile memory for storing standard configuration settings for the gunshot sensor units and the control panel, and the control panel generates tampering alerts for the control panel and/or the gunshot sensor units based on a comparison of the changed configuration settings and the standard configuration settings.

12. The method as claimed in claim 7, wherein the control panel comprises nonvolatile memory for storing a tampering alert policy, and the control panel generates tampering alerts for the control panel and/or the gunshot sensor units based on the tampering alert policy and the monitored configuration settings.

13. A system for detecting gunshots, the system comprising:
   gunshot sensor units for detecting gunshots, the gunshot sensor units comprising controllers for generating event data for the detected gunshots; and
   a control panel for receiving the event data, the control panel monitoring for tampering events for the gunshot sensor units;
   wherein the control panel monitors for tampering events for the gunshot sensor units based on machine certificates for the gunshot sensor units and the gunshot sensor units sign the event data using the machine certificates by computing one-way hashes of the machine certificates and/or a predetermined reference number, and the control panel monitors for the tampering events by independently computing the one-way hashes.

14. The system as claimed in claim 13, wherein the gunshot sensor units comprise nonvolatile memory for storing the machine certificates.

15. The system as claimed in claim 13, wherein the control panel monitors for the tampering events based on the signed event data.

16. The system as claimed in claim 13, wherein the control panel generates tampering alerts for the gunshot sensor units in response to detecting the tampering events.

17. A method for detecting gunshots, the method comprising:
   receiving event data generated by gunshot sensor units based on detected gunshots;
   monitoring for tampering events for the gunshot sensor units based on machine certificates for the gunshot sensor units and the gunshot sensor units signing the event data using the machine certificates and monitoring for the tampering events by independently computing one-way hashes of the machine certificates and/or a predetermined reference number, the one-way hashes being computed by the gunshot sensor units to sign the event data.

18. The method as claimed in claim 17, further comprising storing the machine certificates in nonvolatile memory of the gunshot sensor units.

19. The method as claimed in claim 17, further comprising monitoring for the tampering events based on the signed event data.

20. The method as claimed in claim 17, further comprising generating tampering alerts for the gunshot sensor units in response to detecting the tampering events.

\* \* \* \* \*